(No Model.) 5 Sheets—Sheet 2.

H. T. BARDWELL.
TYPE WRITING MACHINE.

No. 496,507. Patented May 2, 1893.

Witnesses.
Lauritz W. Möller.
S. C. Fearing.

Inventor.
Herbert T. Bardwell
By Jas. H. Churchill
Atty.

(No Model.)  5 Sheets—Sheet 5.

H. T. BARDWELL.
TYPE WRITING MACHINE.

No. 496,507.  Patented May 2, 1893.

Witnesses.
Lauritz N. Möller
S. C. Fearing

Inventor.
Herbert T. Bardwell
By Jas. H. Churchill
Atty.

UNITED STATES PATENT OFFICE.

HERBERT T. BARDWELL, OF BOSTON, MASSACHUSETTS.

TYPE-WRITING MACHINE.

SPECIFICATION forming part of Letters Patent No. 496,507, dated May 2, 1893.

Application filed March 10, 1892. Serial No. 424,430. (No model.)

*To all whom it may concern:*

Be it known that I, HERBERT T. BARDWELL, residing in Boston, county of Suffolk, and State of Massachusetts, have invented an Improvement in Type-Writing Machines, of which the following description, in connection with the accompanying drawings, is a specification, like letters and figures on the drawings representing like parts.

This invention relates to type-writers and has for its object to provide a simple, cheap and efficient instrument.

One feature of my invention consists in a novel construction, as will be described, whereby the type-carrier may be provided with a plurality of different characters, such as, small letters, capitals and figures, and whereby a single key may represent and effect the printing of each of the different characters, that is, each key may effect the printing of a small letter, a capital, a figure, or any other desired character, as will be described. The type-carrier referred to is preferably made as a wheel or disk mounted on a preferably horizontal shaft and having a rotary motion in opposite directions, which may and preferably will be accomplished by means of cams, actuated by the key levers.

My invention further consists in novel details of construction which will be hereinafter specifically described and pointed out in the claims.

Fig. 1ª is a top or plan view of the remaining portion of the type-writer shown in Fig. 1, and is to be read in connection with Fig. 1. Fig. 2ª, a front elevation of the left-hand portion of the type-writer shown in Fig. 2, and is to be read in connection with Fig. 2. Fig. 3ª, a left-hand view of the remaining portion of the type-writer, and is to be read in connection with Fig. 3. Fig. 4 is an end elevation of the type-writer shown in Fig. 1, looking toward the left or in the direction of arrow 20 thereon. Figs. 9 and 10, details of the locking mechanism for the capital and figure keys, as will be described; Fig. 11, a detail to be referred to; Fig. 12, a detail of the spring for returning the type-carrier to its normal position upon the release of a key-lever; Figs. 13, 14 and 15, details to be referred to; Fig. 18, a detail of the type-wheel and paper-roll to be referred to; Fig. 19, a detail of the cam for effecting a change in the starting positions of the type-carrier, to be hereinafter referred to; Fig. 20, a detail of the ribbon-shifting mechanism to be referred to, and Fig. 21, a modification to be referred to.

A represents a bed-plate or base of wood, metal, or other suitable material, upon which the operating parts of my improved machine are supported.

In accordance with my invention, my improved type-writer is provided with a movable type-carrier, preferably made as herein shown, it consisting of a substantially large wheel or disk $a$ mounted upon a shaft $a'$, herein shown as horizontally supported in bearings $a^2$ on a post or upright $a^3$ secured to the bed-plate A, substantially near its longitudinal center. The horizontal shaft $a'$ is mounted in its bearings $a^2$ so as to slide therein, and the said shaft has keyed upon it a beveled pinion or gear $a^4$ (see Fig. 1,) with which meshes a segmental gear or rack $a^5$, secured to or forming part of an arm $a^6$, herein shown as forming part of a hub $a^7$, loosely mounted on a shaft $a^8$ extended the length of the machine, and having bearings in uprights $a^9$ secured to the base A near its opposite ends. The hub $a^7$ is prevented from moving longitudinally on the shaft $a^8$, as herein shown, preferably by two bosses or hubs $a^{10}$ $a^{12}$ keyed or otherwise firmly secured to the shaft $a^8$. The hub $a^7$ is connected to the shaft $a^8$ to move therewith, as herein shown, by means of a stud or screw $a^{14}$, extended through an enlargement or hub $a^{15}$ on a rod $a^{16}$, which is extended through arms $a^{18}$ $a^{19}$ on the hubs $a^{10}$ $a^{12}$, and is fastened to the said arms by set screws $a^{20}$, which, as shown, extend into slots $a^{21}$ in the upper surface of the bar $a^{16}$, the screw or stud $a^{14}$, after passing through the enlargement or hub $a^{15}$, entering a cam-shaped groove or slot $a^{210}$ in the hub $a^{7}$. From this construction it will be seen that if the shaft $a^{8}$ is moved, as will be described, the collars or hubs $a^{10}$ $a^{12}$ move with it, and through the intermediate connection of the rod $a^{16}$ and stud $a^{14}$, the hub $a^{7}$ is moved.

Figures 4, 21:
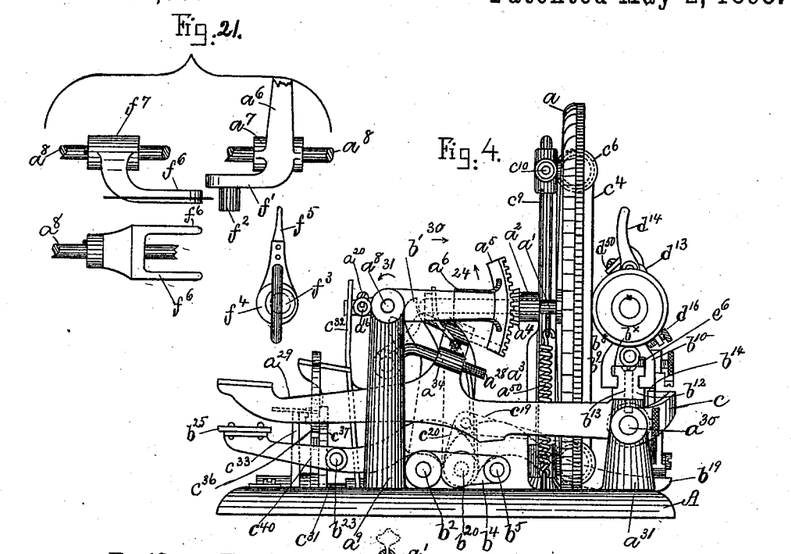
Figure 5:
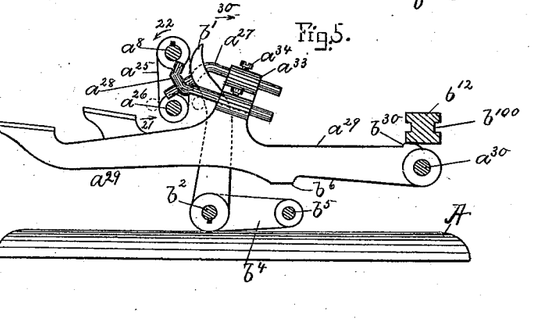
Fig. 5 is a detail to more clearly show the key-levers and the cams operated thereby.

The shaft $a^{8}$ has connected to it by depending arms $a^{25}$, a rod $a^{26}$ located, as represented in Fig. 5, below the shaft $a^{8}$ and substantially in line therewith. The rod $a^{26}$ is adapted to be engaged by cams $a^{27}$ $a^{28}$, secured to key-levers $a^{29}$ pivotally mounted on the shaft $a^{30}$ located at the rear of the machine, and having bearings in suitable uprights $a^{31}$ (see Figs. 3 and 4). Each key-lever $a^{29}$ has secured to it one of the cams $a^{27}$ $a^{28}$, the said cams being shown in Fig. 5 as rods, each of which is extended through a boss $a^{33}$ on the key-lever and secured therein by set screw $a^{34}$.

The type-wheel or carrier $a$ in my present machine is designed to have a rotary movement in opposite directions through an angle of about one hundred and eighty degrees, and the movement or rotation of the said type-carrier in one direction, may be effected by one-half of the key-levers, and the movement in the opposite direction may be effected by the remaining half of the key-levers. To effect this result, the cam $a^{27}$ is bent or shaped in one direction, and the cam $a^{28}$ is bent or shaped in the opposite direction.

Referring to Fig. 5, it will be seen that the cam $a^{27}$ has its end bent or shaped downward, so as to overlap the rod $a^{26}$ and act on the front side of the rod viewing Fig. 5, and the cam $a^{28}$ is bent or shaped upward, so as to act on the rear side of the rod $a^{26}$, when a key-lever is depressed. The cam $a^{27}$, acting on the front side of the rod $a^{26}$, moves the said rod in the direction of arrow 21, Fig. 5, and causes the shaft $a^{8}$ to be rocked in the direction of arrow 22, and the cam hub $a^{7}$, through the hubs $a^{10}$ $a^{12}$, rod $a^{16}$ and stud $a^{14}$, is moved in the direction of arrow 22, thereby moving the segmental rack $a^{5}$ upward or in the direction of arrow 24, Fig. 4, and causing the type-wheel $a$ to be revolved in the direction of arrow 25, Fig. 1. When a key-lever carrying a cam $a^{28}$ is depressed, it moves the rod $a^{26}$ in a direction opposite to that indicated by arrow 21, and rocks the shaft $a^{8}$ in a direction opposite to that indicated by arrow 22, and thereby moves the type-wheel in a direction opposite to that indicated by arrow 25. In this manner the type-carrier is revolved to bring the proper letter on its surface in correct position with relation to a paper-carrying roll $b$, to place the desired character or letter in position to be printed. The type-carrier $a$ may be returned to its normal or starting position, as herein shown, by a spring $a^{50}$, one end of which engages a V-shaped eye $a^{51}$ secured to the shaft $a'$, and the other end of which is secured to the base A.

Figures 1, 9, 10, 11, 19, 20:
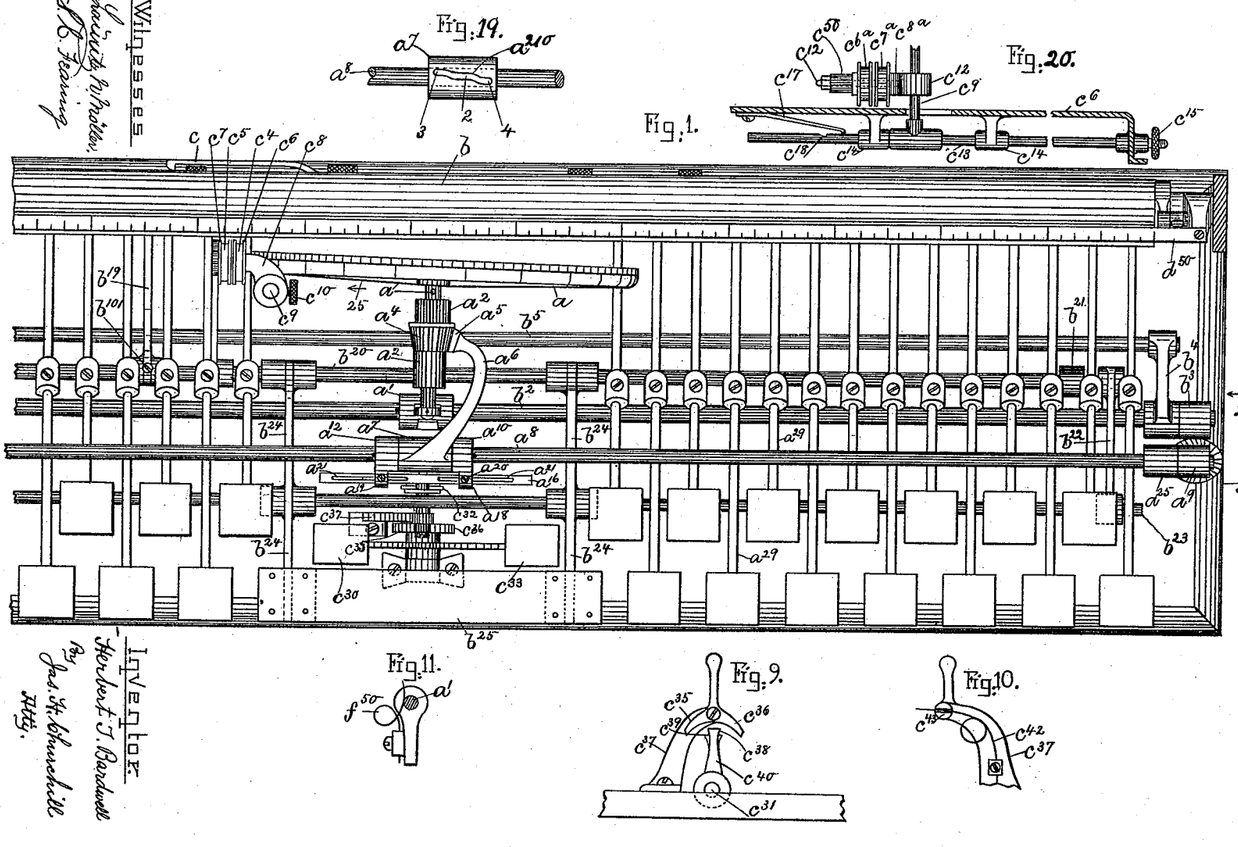
Figure 1:
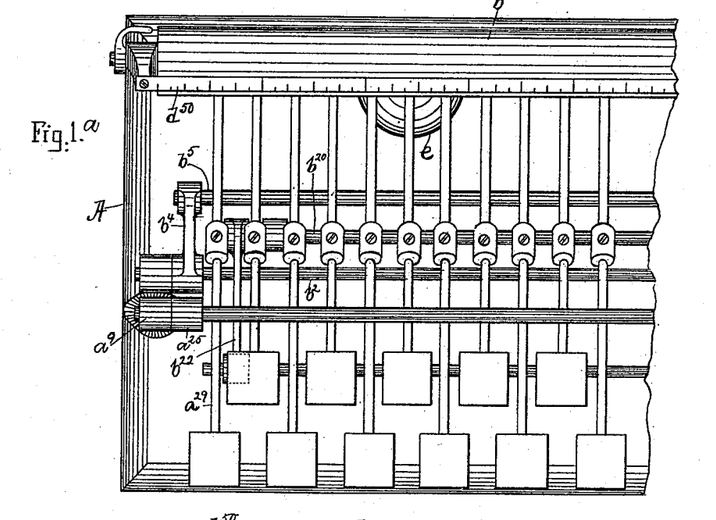
Figure 1 is a top or plan view partially broken out of a type-writer embodying my invention.
Figure 18:
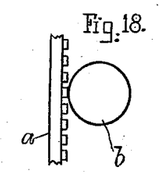

Referring to Fig. 1, it will be noticed that the type-carrier or wheel $a$ is inclined, so that when the type-carrier is moved as will be described, to effect the printing of a character, only one point or surface of the type-wheel will be brought in contact with the paper-carrying roll $b$, as shown in Fig. 18, and consequently, only the desired letter or character will be printed. The type-carrier $a$ may be brought in contact with the paper on the roll $b$, when a key-lever is depressed, by a mechanism, as will now be described. The shaft $a'$ near its end opposite to the type-carrier, has co-operating with it an upright arm $b'$, see Fig. 4, which abuts against the shaft $a'$. The arm $b'$ is fast on a shaft $b^{2}$ having bearings in suitable uprights $b^{3}$ at the opposite ends of the machine, and the said shaft has mounted upon it, rearwardly projecting arms $b^{4}$ (see Fig. 5) connected together by a rod $b^{5}$, located below and in line with the key-levers $a^{29}$. Each key-lever is preferably provided on its under side with a cam or projection $b^{6}$, which is adapted to strike upon the rod $b^{5}$ when a key-lever is depressed. The cam $b^{6}$ on a key-lever, striking against the rod $b^{5}$, moves the said rod downward, and thereby rocks the shaft $b^{2}$, so as to move the arm $b'$ forward or in the direction of arrow 30, Fig. 5, and thereby move the shaft $a'$ and its type-carrier forward in the direction of arrow 30, thus causing the type-carrier to impinge upon the paper on the paper-carrying roll $b$, and effect a printing of the letter or character represented by the key depressed. The paper-carrying roll $b$ is mounted upon a paper-carriage or frame $b^{8}$, represented in Fig. 4 as provided with depending arms $b^{9}$ $b^{10}$, having inwardly projecting lugs $b^{×}$ extended substantially the length of the frame $b^{8}$, and which enter into guideways or slots $b^{100}$ (see Fig. 5) on the opposite sides of a bar or frame $b^{12}$, secured to the uprights or posts $a^{31}$, as herein represented, by countersunk screws $b^{13}$, shown in dotted lines, Fig. 4. The paper-carriage is provided on its rear side with rack-teeth $b^{14}$, (see Figs. 3, 4, and 8) with which engages a pawl $b^{15}$, pivoted to a carrier, shown as an elbow lever provided with the upright arm $b^{16}$ and with the substantially horizontal arm $b^{17}$, the said elbow lever being pivoted to a suitable support or upright $b^{18}$ on the bed-plate A (see Fig. 3). The arm $b^{17}$ is engaged on its under side by an arm $b^{19}$, preferably adjustably secured on a rock-shaft $b^{20}$ by a set screw $b^{101}$ (see Fig. 1), the said rock-shaft having bearings in suitable uprights $b^{21}$ near the opposite ends of the bed-plate A. The rock-shaft $b^{20}$ is connected near its opposite ends, by arms $b^{22}$, to a rod $b^{23}$, to which is fastened, substantially near the center of the machine, arms $b^{24}$, having secured to them a spacing-key $b^{25}$, the arms $b^{24}$, as represented in Fig. 1, being also connected to the rock-shaft $b^{20}$. The key-levers $a^{29}$ are adapted, when depressed, to strike the rod $b^{23}$ and move it downward, thereby rocking the shaft $b^{20}$ so as to move the arm $b^{19}$ upward, and lift the arm $b^{17}$, thus rocking the arm $b^{16}$ on its pivot and moving the pawl $b^{15}$ into engagement with a new tooth of the rack $b^{14}$, so that when the key-lever $a^{29}$ is released, the carriage through the rack-bar $b^{14}$ and pawl $b^{15}$ may be moved forward the desired distance, by the spring $b^{26}$ encircling the pivot of the arm $b^{17}$. Each individual key-lever $a^{29}$ is preferably provided with a hub $b^{27}$, through which the shaft $a^{30}$ is extended, and each hub $b^{27}$ is preferably provided with a coiled spring $b^{28}$ by which the lever $a^{29}$ may be raised or restored to its normal position, after it has been released by the operator, the said key-lever being stopped in its upward movement, as herein shown, by a cam or projection $b^{30}$ striking against the under side of the carriage-supporting frame $b^{12}$ (see Fig. 5). The forward movement of the carriage, after each depression of a key-lever is limited by a stop, shown as an arm $c$ (see Fig. 3), preferably adjustably secured on the shaft $a^{30}$ by a set screw $c'$, the said arm being provided on its inner side with a hook or projection $c^2$ (see dotted lines, Fig. 3), against which the cam projection $c^{100}$ strikes, and by which the pawl $b^{15}$ is disengaged from the rack $b^{14}$, thereby leaving the carriage free to be moved by hand in either direction. When the arm $b^{16}$ is moved by the depression of a key, the cam projection $c^{100}$ is moved away from its stop $c^2$ and the pawl $b^{15}$ is thrown into engagement with the rack $b^{14}$ by a spring $c^{101}$, the latter spring being weaker than the spring $b^{26}$. The arm $b^{19}$, which lifts the arm $b^{17}$ to place the pawl $b^{15}$ in engagement with a new tooth of the rack-bar, may be adjustably secured on its shaft $b^{20}$ by the set screw $b^{101}$, as shown in Fig. 1, so that the said arm may have its outer end adjusted with relation to the arm $b^{17}$, to move the arm $b^{17}$ a greater or less distance when a key-lever is depressed, to carry the pawl $b^{15}$ over one or more teeth, according as it is desired to have the carriage feed a greater or less distance after each depression of a key-lever, but I prefer to permanently secure the arm $b^{19}$ on its shaft $b^{20}$, and adjust the position of the arm $c$ on its shaft $a^{30}$, when it is desired to vary the letter spaces. The type-carrier $a$ has co-operating with it one or more ink-ribbons $c^4$ $c^5$ passed about drums $c^6$ $c^7$ loosely mounted on an arm or shaft secured to a vertical rod or carrier $c^9$, as by a set screw $c^{10}$, and the said carrier or rod $c^9$ has secured to its lower end, substantially near the bed-plate A, a second arm or shaft $c^{12}$ (see Fig. 20), upon which is loosely mounted like drums $c^{6a}$ $c^{7a}$, which co-operate with the drums $c^6$ $c^7$ and about which the ink-ribbons $c^4$ $c^5$ are passed. One of the ink-ribbons, as $c^4$, may be a record ribbon, and the other ribbon, as $c^5$, may be a copying ribbon, and in order that both the said ribbons may be readily used with the type-carrier, the shaft or carrier $c^9$ is made movable across the machine, so that either ribbon may be brought into position to co-operate with the type on the type-carrier $a$. The ribbon-carrier $c^9$ may and preferably will be made movable, as will now be described.

Referring to Fig. 20, the ribbon-carrying shaft $c^9$ is extended below the bed-plate A and is secured to a sliding-rod $c^{13}$, having bearings in brackets $c^{14}$ depending from the under side of the bed-plate, the rod $c^{13}$ being shown as extended through the side of the bed-plate and provided, as shown, with the handle $c^{15}$, by means of which the rod $c^{13}$ may be moved longitudinally in its bearings $c^{14}$. Normally the record ribbon $c^4$ is preferably in line with the type on the type-carrier $a$, and the ribbon-carrier $c^9$ is in the position shown in Fig. 1, but when it is desired to employ the copying ribbon $c^5$, the ribbon-carrier $c^9$ will be moved toward the right in Fig. 20 until the copying ribbon $c^5$ has been placed in line with the type on the type-carrier, and at such time I prefer to lock the shaft or rod $c^{13}$ by a locking device, shown as a spring $c^{17}$ engaging a notch $c^{18}$ in the said rod.

Figure 6:
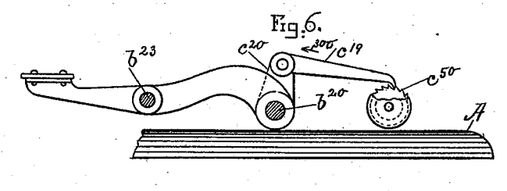
Fig. 6, a detail of the mechanism for automatically feeding the ink-ribbon.

In order that the ink-ribbon co-operating with the type, may be automatically fed a short distance, to present a new piece or surface of the ribbon to be acted upon, the drums $c^{6a}$ $c^{7a}$ have secured to them a ratchet-wheel $c^{50}$ which is engaged by the push-pawl $c^{19}$ (see Fig. 6), pivoted on a crank or arm $c^{20}$ fast on the shaft $b^{20}$. When a key-lever is depressed, it strikes the rod $b^{23}$ and rocks the shaft $b^{20}$ forward, thereby moving the crank or arm $c^{20}$ and its pawl $c^{19}$ forward in the direction of arrow 300, the pawl slipping over the teeth on the ratchet-wheel $c^{50}$, and when the key-lever is released, and the rock-shaft $h^{20}$ restored to its normal position, the pawl $c^{19}$ pushes the ratchet-wheel in the direction opposite to that indicated by arrow 300 and thereby feeds the ink-ribbon.

Figure 3:
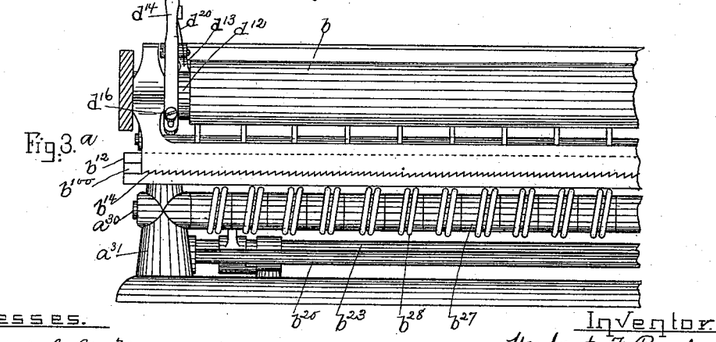
Fig. 3 is a rear elevation partially broken out of the type-writer shown in Fig. 1.

In order that each key-lever may be used to effect the printing of a plurality of characters, the different characters, such for instance, as the capitals, small letters and figures, are arranged about the type-carrier $a$ in predetermined sequence or groups, each group consisting of different characters, and the desired sequence to be printed is controlled by a positioning device, herein shown as the cam-hub $a^7$, as will be described. When three different characters are to be designated by one key-lever, the type-carrier $a$ is sub-divided into divisions, each including three different characters, and the same characters occupy the same relative place or position in each division, as for instance, a small letter and a figure or other character, will intervene between two succeeding capitals, and likewise, a capital and a figure or other character will intervene between two adjacent or succeeding small letters, as represented in Fig. 3.

Figure 2:
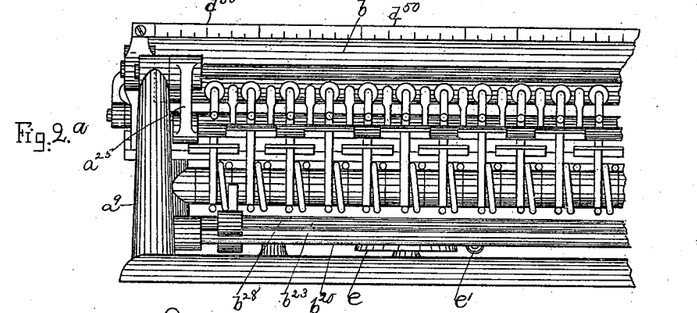
Fig. 2 is a front elevation partially broken out of the type-writer shown in Fig. 1.

Referring to Fig. 19, the cam-slot $a^{21}$ is provided with a substantially straight or horizontal portion marked 2, and an upper and lower portion marked 3, 4, the upper and lower portions being at opposite ends of the slot on opposite sides of the substantially straight or horizontal portion 2. In the normal condition of the apparatus, the stud or pin $a^{14}$ is in engagement with the straight or horizontal portion 2 of the cam-hub $a^7$, and at such time the type-carrier may be supposed to be in position to print a small letter. If now it is desired to print capitals, the stud or pin $a^{14}$ is moved into engagement with the cam portion 3 of the slot $a^{21}$, and as a result, the cam-hub $a^7$ is moved downward on its shaft in the direction indicated by arrow 31, Fig. 4, and the segmental rack $a^5$ is moved in the direction indicated by arrow 24, thereby revolving the type-carrier in the direction indicated by arrow 25, thus placing a capital letter in proper position to be printed upon the paper, carried by the paper-roll $b$. The stud or pin $a^{14}$ is moved into the elevated portion 3 of the cam-slot, as herein represented, by depressing a finger key $c^{30}$ mounted on a shaft $c^{31}$ supported on the bed-plate A, and having secured to it an upright arm $c^{32}$ forked at its upper end to embrace the pin or stud $a^{14}$, the said shaft being also provided with a like finger key $c^{33}$, extended in the opposite direction from the finger key $c^{30}$, and designed to be operated to place the figures on the type-wheel in correct position, when it is desired to print a figure. The finger keys $c^{30}$ $c^{33}$ are kept in their normal position represented in Fig. 2, preferably by springs $c^{34}$ $c^{35}$ secured to the bed plate as by screws $c^{36}$, and acting upon the under side of the said finger keys. When the capital finger key $c^{30}$ has been depressed and the type-wheel $a$ has been moved to bring a capital letter in correct position for printing, the manipulation of any of the letter key levers, while the pin $a^{14}$ is in engagement with the portion 3 of the slot $a^{21}$, will effect the printing of a capital of the particular key-lever depressed, and while the stud or pin $a^{14}$ remains in engagement with the portion 3 of the cam-slot, nothing but capitals will be printed. By means of the finger key $c^{33}$, the stud or pin $a^{14}$ may be brought into engagement with the lower portion 4 of the cam-slot $a^{21}$, and thereby revolve the type-wheel $a$ in the direction opposite to that indicated by arrow 25, so as to bring a figure on the type-wheel in correct printing position, and while the pin or stud $a^{14}$ remains in engagement with the portion 4 of the cam-slot, the key-levers may be depressed to effect the printing of the figures.

The capital and figure keys $c^{30}$ $c^{33}$ may be locked in their depressed position by means of a locking device, shown as pawls $c^{35}$ $c^{36}$ pivoted on an arm or upright $c^{37}$, and adapted to engage teeth or notches $c^{38}$ $c^{39}$ on an upright or arm $c^{40}$ secured to the shaft $c^{31}$. As herein represented, the arm $c^{40}$ is turned to the left, viewing Fig. 9, when the capital finger key $c^{30}$ is depressed, and the pawl $c^{35}$ is engaged with the tooth $c^{38}$, and when the finger key $c^{33}$ is depressed, the arm $c^{40}$ is moved toward the right, viewing Fig. 9, and the tooth $c^{39}$ brought into engagement with the pawl $c^{36}$. The pawls $c^{35}$ $c^{36}$ lock the stud $a^{14}$ in engagement with the particular portion of the cam-slot $a^{21}$ with which it is engaged, until the pawls are positively disengaged from their co-operating teeth $c^{38}$ $c^{39}$, to permit the stud $a^{14}$ to be brought back into engagement with the horizontal or middle portion 2 of the cam-slot $a^{21}$, and thereby bring the type-wheel into its normal position. The pawls $c^{35}$ $c^{36}$ are maintained in their normal position shown in Fig. 9, as herein represented, by means of a spring $c^{42}$ (see Fig. 10) secured to the upright or arm $c^{37}$ and having one end connected to the pivot $c^{43}$ of the pawls. It will thus be seen that with the machine herein shown, each key-lever may be used to effect the printing of a plurality of characters. I have herein shown the cam-slot $a^{21}$ so made as to obtain three different starting positions of the type-carrier, but I do not desire to limit myself in this respect, as it is evident the cam-slot may be provided with any desired number of irregular portions to effect any desired number of different positions of the type-carrier.

Figures 12, 13, 15:
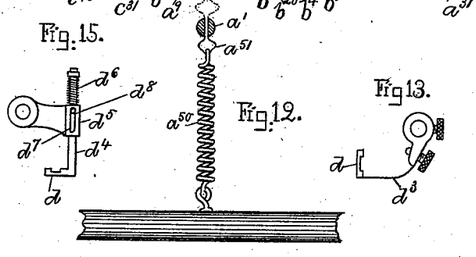
Figure 14:
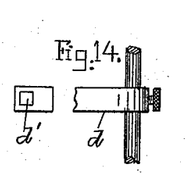

In practice, my improved type-writer may and preferably will be provided with a frisket or slotted plate $d$, having a slot $d'$ of the size of a type on the machine, and through which the type may pass and strike against the ink-ribbon. In Figs. 13, 14 and 15, I have shown several different forms of friskets, which can be used on the machine. In Fig. 14, the frisket $d$ is shown as a metal ribbon or strip, and in Fig. 13, a slotted plate secured to a metal strip or flat spring $d^3$, and in Fig. 15, a slotted arm on a rod $d^4$ sliding in a bearing $d^5$, and normally kept away from the paper-roll by a spring $d^6$ encircling the said rod, the said bearing being provided with a slot $d^7$ through which is extended a stud $d^8$ on the rod $d^4$.

Figure 16:
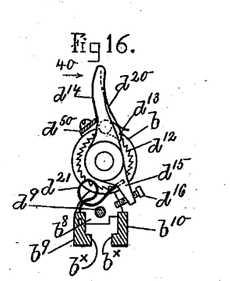
Fig. 16, a detail of the feed-mechanism for the paper-roll.
Figure 17:
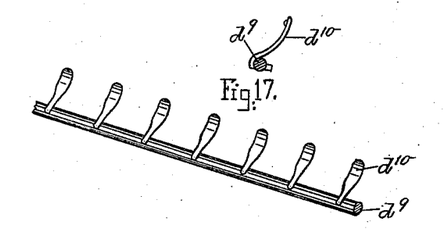
Fig. 17, a detail of one form of presser-bar to keep the paper in contact with the paper-roll.

The machine may be provided with any usual or well known form of presser bar, by which the paper is kept in contact with the roll, one form being shown in Fig. 17 as consisting of a rod $d^9$ having spring arms $d^{10}$, the said rod having bearings in the carriage-frame, as shown in Fig. 16. The paper-roll $b$ may be rotated step by step to effect the spacing of the lines, by a mechanism such as shown in detail in Fig. 16.

Referring to Fig. 16, the paper-roll $b$ has secured to it a ratchet-wheel $d^{12}$ with which engages a push-pawl $d^{13}$ on an arm $d^{14}$, loosely mounted on the shaft of the paper-roll, and provided with a lug or finger $d^{15}$ carrying an adjustable screw or stop $d^{16}$ abutting against a fixed stop, herein shown as the presser-rod $d^9$. The pawl $d^{13}$ is kept in engagement with the ratchet-wheel $d^{12}$ by a spring $d^{20}$. When it is desired to feed the paper forward, to present a new surface to be printed upon, the arm $d^{14}$ is moved by hand in the direction of arrow 40, Fig. 16, until the stop-screw $d^{16}$ engages with its co-operating stop or presser-bar $d^9$, and when the paper-roll has been fed forward, the operator releases the lever $d^{14}$, and a spring $d^{21}$ moves the arm $d^{14}$ back to its normal position, against a suitable back stop, herein shown as the usual scale $d^{50}$. When the arm $d^{14}$ is moved backward by the spring $d^{21}$, it carries the pawl $d^{13}$ with it, and engages the said pawl with a new tooth of the ratchet-wheel. By adjusting the stop-screw $d^{16}$, the amount of paper to be fed forward may be varied as desired, to obtain the desired or required distance between the lines on the paper.

The machine is provided with a bell $e$ (see Fig. 3), secured to the base A, and adapted to be struck by a hammer $e'$, shown in said figure, as secured to a spring arm $e^2$, extended up into the path of movement of a stop or lug $e^3$, preferably adjustably secured to the carriage $b^8$. The stop $e^3$ may be adjusted on the carriage to strike the hammer arm $e^2$ at any desired point in the forward feed of the carriage. The carriage is also provided, as herein shown, with a lug or stop $e^5$ adapted to strike a pin or projection $e^6$ on the frame $b^{12}$ (see Fig. 4) to limit the backward movement of the carriage, when the latter is moved by hand back to its starting position. The pin or projection $e^6$ is preferably made detachable from the frame $b^{12}$, to permit it to be removed, when it is desired to remove the carriage from the machine.

Figures 7, 8:
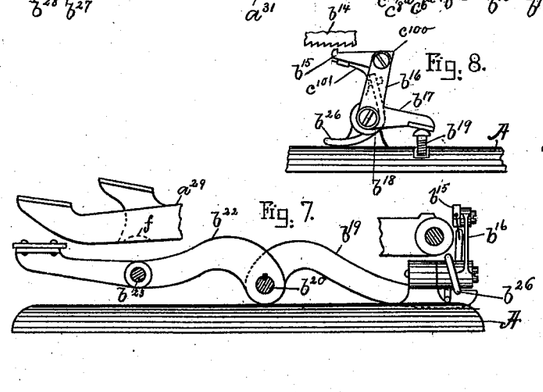
Figs. 7 and 8, details of the carriage-feed mechanism, Fig. 8 representing a rear elevation of part of the mechanism shown in Fig. 7.

In order to obtain a substantial uniformity between the different letters printed, irrespective of the size or width of the letters, each key-lever may be provided on its under side with a cam $f$ represented in Fig. 7 as a depression or concavity in the lever which comes in contact with the bar $b^{23}$, to effect a varying movement of the carriage. By means of the cams $f$ on the key-levers, the rocking of the shaft $b^{20}$ and thereby the movement of the arm $b^{19}$, may be varied, to vary the forward movement of the carriage to obtain the desired letter space. For instance, a key-lever having a substantially wide letter, such as m, w, &c., may have a cam $f$ of such shape as to produce a greater rocking of the rod $b^{20}$, than a cam $f$ on a key of a substantially narrow letter, as for instance, the letter i, l, &c.

I have herein shown one form of type-carrier positioning device for obtaining different starting positions of the type-carrier, and while I may prefer the construction shown, I do not desire to limit myself in this respect, as other forms of devices may be used to accomplish the same purpose, such for instance, as shown in Fig. 21.

Referring to Fig. 21, the arm $a^6$ is shown as secured to a hub $a^7$ provided with an arm $f'$ having a stud or roller $f^2$, which is designed to fit into a hole or opening $f^3$ in a cam-shaped hub $f^4$ having secured to it a handle or pointer $f^5$, the cam-shaped hub having its periphery embraced by a forked arm $f^6$ on a hub $f^7$ fast to the shaft $a^8$. The cam-hub $f'$ is shaped, so that when the handle is in its vertical position shown, the type-carrier is in position to effect the printing of one set of characters, as for instance, small letters, and when the pointer is turned to the right, the hub $a^7$ is rocked through the stud or roller $f^2$ to place a second set of characters in the starting position, and when the pointer is turned to the left, the hub $a^7$ is rocked in the opposite direction by the cam-hub $f^4$ and stud $f^2$, to place another set of characters in the starting position. When the type-carrier $a$ is returned to its position at rest, by the spring $a^{50}$, any tendency of the shaft $a'$ and of the said type-carrier, to vibrate before coming to rest, may be obviated by a brake or stop mechanism, shown in Fig. 11 as a spring $f^{50}$ which bears against the shaft $a'$.

I claim—

1. In a typewriter, the combination with a movable type-carrier provided with a plurality of characters, a revoluble shaft on which the type-carrier is mounted, a gear or pinion on said shaft, a rock-shaft $a^8$, a hub loosely mounted on said rock-shaft, a gear or rack connected to the said hub and in engagement with the gear or pinion on the type-carrier shaft, character keys to operate said rock-shaft, and a positioning device to operate the said hub without operating the rock-shaft, substantially as described.

2. In a type-writer, the combination of the following instrumentalities, viz.—a revoluble type-carrier provided with a plurality of characters arranged in predetermined sequence or position, a shaft on which the said carrier is mounted, a gear or pinion on said shaft, a gear or rack in mesh with the gear or pinion on the type-carrier shaft, a rock-shaft to which the gear or rack-bar is connected to be moved thereby, character keys to rock the said rock-shaft, and a positioning device to move the gear or rack-bar independent of the character keys, substantially as described.

3. In a type-writer, the combination of the following instrumentalities, viz.—a revoluble type-carrier provided with a plurality of characters arranged in predetermined sequence or position, a shaft on which the said carrier is mounted, a gear or pinion on said shaft, a gear or rack in mesh with the gear or pinion on the type-carrier shaft, a rock-shaft to which the gear or rack-bar is connected to be moved thereby, character keys to rock the said rock-shaft, and a positioning device to move the gear or rack-bar independent of the character keys, and means operated by the character keys to move the type-carrier shaft longitudinally to effect a print of the type, substantially as described.

4. In a type-writer, the combination of the following instrumentalities, viz.—a vertically revoluble type-carrier provided with a plurality of characters, a substantially horizontal shaft on which the said carrier is mounted, a rock-shaft and intermediate gearing to connect the said rock-shaft with the type-carrier shaft, a rod $a^{26}$ connected to the said rock-shaft, character keys and cams carried thereby to operate on said rod and rock the said rock-shaft, and means operated by the character keys to move the type-carrier shaft longitudinally, substantially as described.

5. In a type-writer, the combination of the following instrumentalities, viz.—a vertically revoluble type-carrier provided with a plurality of characters, a substantially horizontal shaft on which the said carrier is mounted, a rock-shaft and intermediate gearing to connect the said rock-shaft with the type-carrier shaft, a rod $a^{26}$ connected to the said rock-shaft, character keys and cams carried thereby to operate on said rod and rock the said rock-shaft, and means to operate the said intermediate gearing independent of the character keys to move the type-carrier into its starting position, substantially as described.

6. In a type-writer, the combination of the following instrumentalities, viz.—a base or bed-plate A, a standard $a^3$ supported thereby, a shaft $a'$ mounted in said standard, a type-carrier secured to said shaft, a pinion or gear on the shaft $a'$, segmental gear or rack $a^5$ in mesh with said pinion or gear, a rock-shaft $a^8$ to which said segmental gear or rack is secured, a rod $a^{26}$ connected to the said rock-shaft, character-key levers provided with cams to act on the rod and rock the shaft $a^8$ to move the type-carrier, means to restore the type-carrier to its normal position at rest, a paper-carrying roll, a carriage in which said roll is mounted, a carriage-supporting frame $b^{12}$, provided with guideways, arms $b^9$ $b^{10}$ on the carriage engaging said guideways, a rack-bar on said carriage, a pawl to engage said rack-bar, an arm $b^{17}$ to which the said pawl is operatively connected, a rock-shaft $b^{20}$, an arm $b^{19}$ secured to the shaft $b^{20}$ and adapted to move the pawl-carrying arm $b^{17}$ when a key-lever is depressed and engage the said pawl with the rack-bar on the carriage, and means to move the carriage forward, substantially as described.

7. In a type-writer, the combination of the following instrumentalities, viz.—a base or bed-plate A, a standard $a^3$ supported thereby, a shaft $a'$ mounted in said standard, a type-carrier secured to said shaft, a pinion or gear on the shaft $a'$, a segmental gear or rack $a^5$ in mesh with said pinion or gear, a rock-shaft $a^8$ to which said segmental gear or rack is secured, a rod $a^{26}$ connected to the said rock-shaft, character-key levers provided with cams to act on the rod and rock the shaft $a^8$ to move the type-carrier, means to restore the type-carrier to its normal position at rest, a paper-carrying roll, a carriage in which said roll is mounted, a carriage-supporting frame $b^{12}$, provided with guideways, arms $b^9$ $b^{10}$ on the carriage engaging said guideways, a rack-bar on said carriage, a pawl to engage said rack-bar, an arm $b^{17}$ to which the said pawl is operatively connected, a rock-shaft $b^{20}$, an arm $b^{19}$ adjustably secured to the shaft $b^{20}$ and adapted to move the pawl-carrying arm $b^{17}$ when a key-lever is depressed and engage the said pawl with the rack-bar on the carriage, and means to move the carriage forward, substantially as described.

8. In a type-writer, the combination of the following instrumentalities, viz.—a base or bed-plate A, a standard $a^3$ supported thereby, a shaft $a'$ mounted in said standard, a type-carrier secured to said shaft, a pinion or gear on the shaft $a'$, a segmental gear or rack $a^5$ in mesh with said pinion or gear, a rock-shaft $a^8$ to which said segmental gear or rack is secured, a rod connected to the said rock-shaft, character-key levers provided with cams to act on the rod and rock the shaft $a^8$ to move the type-carrier, means to restore the type-carrier to its normal position at rest, a paper-carrying roll, a carriage in which said roll is mounted, a carriage-supporting frame $b^{12}$, provided with guideways, arms $b^9$ $b^{10}$ on the carriage engaging said guideways, a rack-bar on said carriage, a pawl to engage said rack-bar, an arm $b^{17}$ to which the said pawl is operatively connected, a rock-shaft $b^{20}$, an arm $b^{19}$ secured to the shaft $b^{20}$ and adapted to move the pawl-carrying arm $b^{17}$, when a key-lever is depressed and engage the said pawl with the rack-bar on the carriage, means to move the carriage forward, an ink-ribbon co-operating with the type-carrier, a carrier $c^9$, drums secured to the said carrier, a ratchet $c^{50}$ attached to one of the said drums, a pawl $c^{19}$ in engagement with the said ratchet, a crank or arm $c^{20}$ on the rock-shaft $b^{20}$ to which the said pawl is secured, substantially as described.

9. In a type-writer, the combination of the following instrumentalities, viz.—a base or bed-plate A, a standard $a^3$ supported thereby, a shaft $a'$ mounted in said standard, a type-carrier secured to said shaft, a pinion or gear on the shaft $a'$, a segmental gear or rack $a^5$ in mesh with said pinion or gear, a rock-shaft $a^8$ to which said segmental gear or rack is secured, a rod connected to the said rock-shaft, character-key levers provided with cams to act on the rod and rock the shaft $a^8$ to move the type-carrier, means to restore the type-carrier to its normal position at rest, a paper-carrying roll, a carriage in which said roll is mounted, a carriage-supporting frame $b^{12}$ provided with guideways, arms $b^9$ $b^{10}$ on the carriage engaging said guideways, a rack-bar on said carriage, a pawl to engage said rack-bar, an adjustable stop with which the said pawl co-operates, an arm $b^{17}$ to which the said pawl is operatively connected, a rock-shaft $b^{20}$, an arm $b^{19}$ secured to the shaft $b^{20}$ and adapted to move the pawl-carrying arm $b^{17}$ when a key-lever is depressed, and engage the said pawl with the rack-bar on the carriage, and means to move the carriage forward, substantially as described.

10. In a type-writer, the combination of the following instrumentalities, viz.—a base or bed-plate A, a standard $a^3$ supported thereby, a shaft $a'$ mounted in said standard, a type-carrier secured to said shaft, a pinion or gear on the shaft $a'$, a segmental gear or rack $a^5$ in mesh with said pinion or gear, a rock-shaft $a^8$ to which said segmental gear or rack is secured, a positioning device for the typecarrier mounted on the rock-shaft $a^8$, a rod connected to the said rock-shaft, character-key levers provided with cams to act on the rod and rock the shaft $a^8$ to move the type-carrier, means to restore the type-carrier to its normal position at rest, a paper-carrying roll, a carriage in which said roll is mounted, a carriage-supporting frame $b^{12}$ provided with guideways, arms $b^9$ $b^{10}$ on the carriage engaging said guideways, a rack-bar on said carriage, a pawl to engage said rack-bar, an arm $b^{17}$ to which the said pawl is operatively connected, a rock-shaft $b^{20}$, an arm $b^{19}$ secured to the shaft $b^{20}$ and adapted to move the pawl-carrying arm $b^{17}$, when a key-lever is depressed, and engage the said pawl with the rack-bar on the carriage, and means to move the carriage forward, substantially as described.

11. In a type-writer, the combination of the following instrumentalities, viz.—a bed-plate, a standard $a^3$, a shaft $a'$ supported by said standard, a type-carrier secured to the shaft $a'$ and provided with a plurality of characters, a pinion on said shaft, a segmental gear or rack $a^5$ in mesh with said pinion, a rock-shaft $a^8$, a positioning device secured to the rock-shaft and to the segmental gear or rack $a^5$, a rod $a^{26}$ connected to the rock-shaft $a^8$, key-levers and cams carried thereby to engage the rod $a^{26}$ and rock the shaft $a^8$ and thereby move the type-carrier from a position at rest, means to restore the type-carrier to its position at rest, an arm to engage the shaft $a'$, a rock-shaft to which the arm is secured, operated by the character keys to effect a longitudinal movement of the shaft $a'$ in one direction, means to move the shaft $a'$ in the opposite direction, a paper-carrying roll, a movable carriage in which the said roll is mounted, and an ink-ribbon or surface interposed between the type-carrier and the said roll, substantially as described.

12. In a typewriter, the combination with a type-carrier provided with a plurality of characters, a shaft on which the said carrier is mounted, a gear or pinion on said type-carrier shaft, a rock-shaft $a^8$, a hub loose on said rock-shaft, and provided with a cam-shaped slot, a gear or rack connected to said hub and in mesh with the gear or pinion on the type-carrier shaft, a stud or pin $a^{14}$ extended into said cam slot, a forked arm $c^{32}$ engaging the said pin and secured to a shaft $c^{31}$ provided with an arm $c^{40}$ having one or more teeth, and one or more pawls to engage said teeth, substantially as described.

13. In a typewriter, the combination of the following instrumentalities, viz.—a movable carriage provided with a rack-bar, a pawl $b^{15}$ to engage said rack-bar and provided with a cam $c^{100}$, a pawl carrier, key levers operatively connected to said pawl-carrier, means to engage the pawl with the rack-bar when a key-lever is depressed, means to act on the pawl-carrier and feed the carriage forward when a key-lever is released, and a stop to co-operate with the pawl and engage the cam $c^{100}$ to disengage the pawl from the rack-bar, substantially as described.

14. In a typewriter, the combination of the following instrumentalities, viz.—a movable carriage provided with a rack-bar, a pawl $b^{15}$ to engage said rack-bar and provided with a cam $c^{100}$, a pawl-carrier, key-levers operatively connected to said pawl-carrier, means to engage the pawl with the rack-bar when a key lever is depressed, means to act on the pawl-carrier and feed the carriage forward when a key-lever is released, and an adjustable stop consisting of an arm $c$ provided with a projection $c^2$ to act on the cam $c^{100}$ and disengage the pawl $b^{15}$ from the rack-bar, substantially as described.

15. In a typewriter, the combination of the following instrumentalities, viz.—a revoluble type-carrier, a shaft on which it is mounted, a pinion or gear on said shaft, a rock-shaft $a^8$, a segmental gear $a^5$ on the rock-shaft in mesh with the pinion on the type-carrier shaft, a rod $a^{26}$ located below and connected to the said rock-shaft, character keys, and cams operated by the said keys to act on the rod $a^{26}$ and move the rock-shaft in opposite directions and thereby revolve the type-carrier in opposite directions, substantially as described.

In testimony whereof I have signed my name to this specification in the presence of two subscribing witnesses.

HERBERT T. BARDWELL.

Witnesses:
JAS. H. CHURCHILL,
SADIE C. FEARING.